United States Patent [19]

More

[11] 4,256,160
[45] Mar. 17, 1981

[54] REMOTE AIR PRESSURE MONITORING AND ADJUSTING DEVICE FOR UNDERSLUNG SPARE TIRES

[76] Inventor: Joseph E. More, 833 Orchard Dr., Redlands, Calif. 92373

[21] Appl. No.: 21,901

[22] Filed: Mar. 19, 1979

[51] Int. Cl.³ .......................................... B60C 29/00
[52] U.S. Cl. .................................. 152/427; 24/73 SA; 137/223; 137/351; 141/384; 224/42.23; 248/75
[58] Field of Search ............... 152/415, 427, 428, 429, 152/431, DIG. 7, DIG. 8, DIG. 13; 141/382–384; 248/58, 75, 79, 233; 24/3 R, 73 SA, 73 R, 81 B; 222/31; 224/42.23, 42.24, 42.06, 42.12, 42.21, 42.26; 137/223, 351; 73/146.4, 146.8

[56] References Cited

U.S. PATENT DOCUMENTS

| | | | |
|---|---|---|---|
| 1,405,164 | 1/1922 | Schein | 248/75 X |
| 2,211,063 | 8/1940 | Kowalkiewicz | 152/415 |
| 2,692,712 | 10/1954 | Conley | 248/75 UX |
| 3,019,831 | 2/1962 | Morrello | 152/415 |
| 3,823,857 | 7/1974 | Yandt | 224/42.24 |
| 3,946,742 | 3/1976 | Eross | 248/75 X |

*Primary Examiner*—John T. Goolkasian
*Assistant Examiner*—Thomas Bokan
*Attorney, Agent, or Firm*—John H. Crowe

[57] ABSTRACT

My invention particularly relates to an apparatus designed to provide the means of checking and replenishing the air supply in a pneumatic spare tire that is stowed in a specially designed carrier or receptacle located in a rearward underslung and inaccessible location as has been adapted to many motor vehicles in use today, including various foreign and U.S. manufactured pick-up trucks, station wagons, recreational vehicles, sports cars such as the U.S. manufactured Chevrolet Corvette and to a lesser extent certain compact automobiles. This represents a departure from the traditional practice of enclosing the spare tire either in a closed compartment or trunk within the body of the vehicle.

1 Claim, 4 Drawing Figures

REMOTE AIR PRESSURE MONITORING AND ADJUSTING DEVICE FOR UNDERSLUNG SPARE TIRES

BACKGROUND OF THE INVENTION

As a consequence of relegating stowage of the spare tire to a rearward underslung location certain problems arise relating to accessibility of the air valve stem for inflation and maintenance of proper air pressure. During the course of routinely checking or replenishing the air pressure of said spare tire, one will encounter circumstances requiring strenuous physical activity as it becomes necessary to remove the spare from its carrier or recepticle underneath said motor vehicle to achieve access to the air valve stem; a considerable task involving heavy and cumbersome lifting complicated by a noisome accumulation of road grime contacted during handling procedures. This becomes a cronic inconvenience contributing to the inclination of most to merely neglect maintenance of said underslung spare tire altogether, which in turn creates a potentially adverse situation if said spare becomes deflated due to normal air leakage simultaneously with one of the running tires in service on said motor vehicle becoming defective. This situation is likely to manifest itself in a most untimely manner hypothesizing that the possiblity of such an occurance could present itself in a remote or hazardous location or at the very least result in an inconvenience due to delays in time and expenditures for a road service call. This invention, as hereinafter described, is intended to add a safety factor that will minimize the possibility of occurance of said hazards and inconveniences as its function is to check and, when necessary, replenish the air pressure in a spare tire mounted in said underslung location from a point readily accessible at the rear of said motor vehicle. By virtue of the fact that this invention will facilitate the proper maintenance of said underslung spare tire, the motorist will be both encouraged and reminded to check the air pressure in said spare tire routinely and concurrently with the running in-service tires on said motor vehicle.

SUMMARY OF THE INVENTION

The components comprising this invention are designed to complement the function of the conventional pneumatic tire air valve so that the air pressure in said underslung spare tire can be measured or replenished as necessary by means of a flexible air hose conduit adapted to permit the passage of air therethrough, one end thereof adapted for connection to said underslung spare tire air valve stem and the other end being routed and secured to an accessible location at the rear of said motor vehicle in proximity to said underslung spare, and it is further stated that said invention will not necessitate any alteration or modification to the conventional spare tire in said underslung location, or to the carrier or receptacle in which said spare is being stowed nor to the motor vehicle itself.

In conjunction with the foregoing, other objects and advantages of this invention will be apparent from the accompanying detailed drawings and succeeding descriptions as set forth in the appended claims.

DESCRIPTION OF A PREFERRED EMBODIMENT

Figure 1:
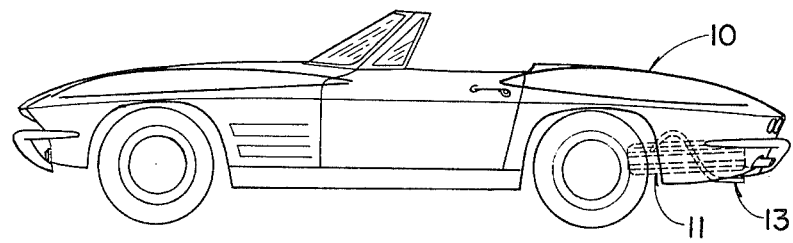
FIG. 1 is a view in side elevation of the U.S. Manufactured Chevrolet Corvette illustrating the intended application of said air-monitoring device as installed on said spare tire stowed in an underslung receptacle.

Referring to FIGS. 1-4 inclusive, like characters will be used to refer to like components common to drawings comprising said figures. Initially, character 10 shall designate a motor vehicle as represented in FIG. 1, by Chevrolet Corvette or in FIG. 2 by a pick-up truck, however, it is understood without further qualification that the term motor vehicle shall include various foreign-made and U.S.-made pick-up trucks, station wagons, recreational vehicles, sports cars, and compact automobiles which have in common implemented a carrier or receptacle located in a rearward position underneath said motor vehicle for stowage of the spare tire.

Figure 2:
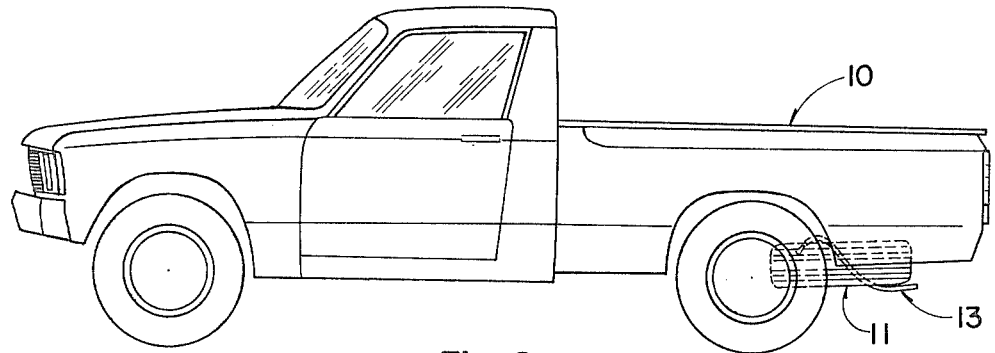
FIG. 2 is a view in side elevation of a typical pick-up truck illustrating the installation of an identical air-monitoring device on said spare tire stowed in an underslung carrier.

As illustrated in FIGS. 1 and 2, the disposition of said air-monitoring device relative to the underslung spare tire 11 provides an extension of the function of the conventional air valve stem 12 to an accessible rearward location allowing continuity of air exchange between said valve stem 12 of said underslung spare tire 11 via a flexible air hose conduit 13 and an air inlet valve 14 adapted from a conventional air valve stem, said flexible air hose conduit 13 and air inlet valve 14 being secured directly to said underslung spare 11 for accessibility rearward on said motor vehicle 10 by means of a flexible and adjustable securing strap 15 with an integral sleeve 16 through which said flexible air hose conduit 13 passes. Thus, the operation of checking or replenishing the air pressure in said underslung spare 11, although stowed in said underslung location, is facilitated by a visable and readily accessible air inlet valve 14 at the rear of said motor vehicle 10.

Figure 3:
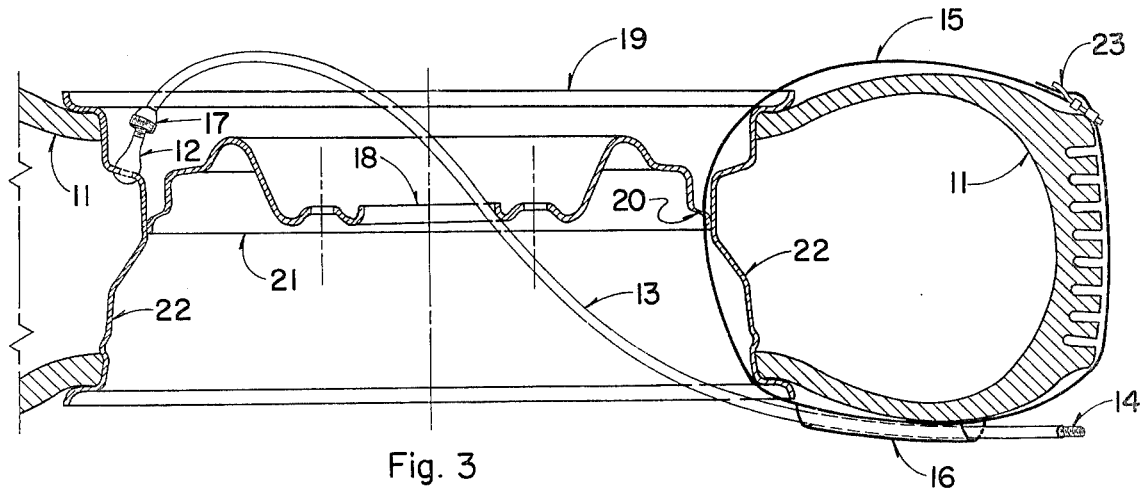
FIG. 3 is a cross-section view of a conventional steel wheel with standard pneumatic tire mounted showing typical installation of said air-monitoring device.
Figure 4:
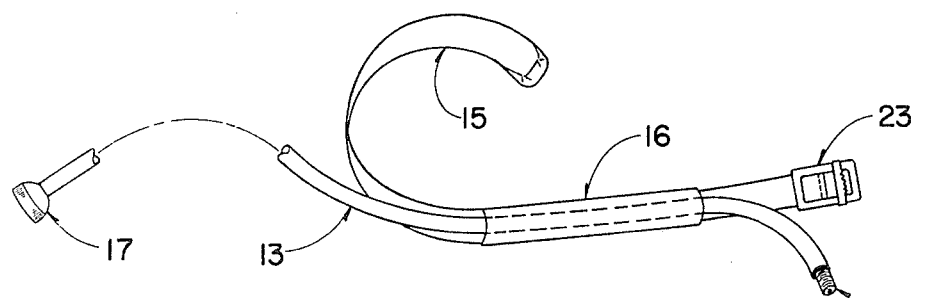
FIG. 4 is a scaled up composite drawing of the air-monitoring device as it would appear detached from said spare.

In conformance with the foregoing, FIGS. 3 and 4 are also included to contribute additional detail necessary to fabricate a functional embodiment suitable for universal application to the previously mentioned motor vehicles 10. In following a logical progression of components of said air-monitoring device beginning at the initial connection to the air inlet valve stem 12 on said underslung spare 11 the mechanical function of said air inlet valve stem 12 being conventional is well known and therefore not shown in detail as a hollow element provided with a pressure-actuated mechanical check valve which when actuated allows air pressure within said underslung spare tire 11 to be increased or decreased. One end of the flexible air hose conduit 13 is connected to said air valve stem 12 of said underslung spare tire 11 by means of a standard rotatable coupling 17 which is internally-threaded to accept the standard externally-threaded air inlet valve stem 12. Additionally, said standard rotatable coupling 17 includes therein, a stationary pin or abutment so positioned that when engaged to said valve stem 12, the aforementioned check valve is mechanically depressed and maintained in an open position, in a known manner, to permit the exchange of air to and from said underslung spare tire 11, via said air-monitoring device. The flexible air hose conduit 13 is then passed through the center hub opening 18 of the wheel 19, as illustrated in FIG. 3, and secured to the under-side of said underslung spare tire 11 by means of a flexible, adjustable securing strap 15 with an integral sleeve 16 through which said flexible air hose conduit 13 passes. Said securing strap 15 is a belt-like arrangement constructed preferably of nylon or other material resistant to deterioration from weather and contaminants, fabricated to a length sufficient to girth the cross-sectional circumference of said underslung spare tire 15 and of proper width to permit insertion through one of the aligned openings 20 which appear at regular intervals between welds that join the center portion 21 of a conventional motor vehicle steel wheel with the outer rim 22. A segment of said flexible securing strap 15 has attached to it a sleeve 16 consisting of like material sewn on the outside edges with each end remaining open and situated relative to the bottom side of said underslung spare tire 11 so as to allow insertion of said flexible air hose conduit 13 at the point where it exits the bottom side of said center hub opening 18 thence, said sleeve 16 anchors and directs a rearward projection of said flexible air hose conduit 13 from where it exits said sleeve 16, to a suitable location preferably at the rear of said motor vehicle 10, the ends of said securing strap 15 having been joined together by a conventional adjustable buckle 23. Finally, there is provided at the terminus of the rearward projection of said flexible air hose conduit 13, an inlet air valve 14 which is substantially the same as any conventional tire valve stem, that is, the outer end of said inlet air valve 14 includes a threaded segment for accommodating a conventional threaded valve stem cap and also incorporates the conventional tire air valve which will accommodate standard service station air hose fittings and function in a known manner identical to the aforementioned spare tire valve stem 12.

In checking or replenishing the air pressure in said underslung spare tire 11, a tire guage or conventional service station air hose may be engaged directly to the outer end of said inlet air valve 14, in the same manner as when checking any spare tire directly as the juxtaposition of all components heretorfore described effectively extends the function of said valve stem 12 of said underslung spare tire 11 to an accessible location at the rear of said motor vehicle 10.

It should be noted that in accordance with this invention, a device is provided, substantially entirely, with a combination of standard or conventional or readily obtainable parts which renders the device adaptable to all motor vehicles that have adopted the arrangement of stowing the spare tire in a carrier or receptacle in an underslung location, and further that the installation of said air-monitoring device is a simple procedure requiring no specific technical ability or specialized equipment nor does the installation in any way involve modifications or alterations to said motor vehicle or any of its components.

In conclusion, while the components enumerated in the above description constitute a preferred embodiment of the invention, it is understood that said invention may be subject to various alterations and modifications without departing from the scope of the inventive concept as defined in the appended claims.

I claim:

1. Air pressure monitoring and adjusting means adapted for attachment to a pneumatic tire with a standard tire inlet valve mounted on a wheel with a rim and center hub opening and stowed in a spare tire carrier located in a rearward, underslung location on a motor vehicle, to permit checking and adjustment of the air pressure in the tire at a readily accessible location at the rear of said motor vehicle, said air pressure monitoring and adjusting means comprising:

a flexible, tubular air conduit fitted at one end with a standard threaded coupling connectible to said tire inlet valve so as to maintain that valve in an open position to permit the uninterrupted exchange of air between said conduit and said tire;

said conduit being fitted at its other end with a standard threaded one-way air inlet valve substantially the same as the tire inlet valve to permit the exchange of air between said tire and said readily accessible location when actuated by a standard air filling device or air gauge at said location;

said flexible, tubular air conduit being of sufficient length to extend from the air inlet valve of said tire through the center hub opening of said wheel thence rearward to said accessible location;

said air pressure monitoring and adjusting means including securing strap means for said conduit comprising a flexible strap sized to extend around the cross-sectional circumference of the tire and adjacent wheel rim, adjustable fastening means for holding said strap securely therearound and means lonigtudinally integral with said strap to provide a sleeve for receiving and holding said conduit underneath said tire in proper position for rearward extension thereof to said accessible location.

* * * * *